Sept. 16, 1941.  M. A. HOLPFER  2,256,089
DRIVE TRANSMISSION
Filed Nov. 13, 1940
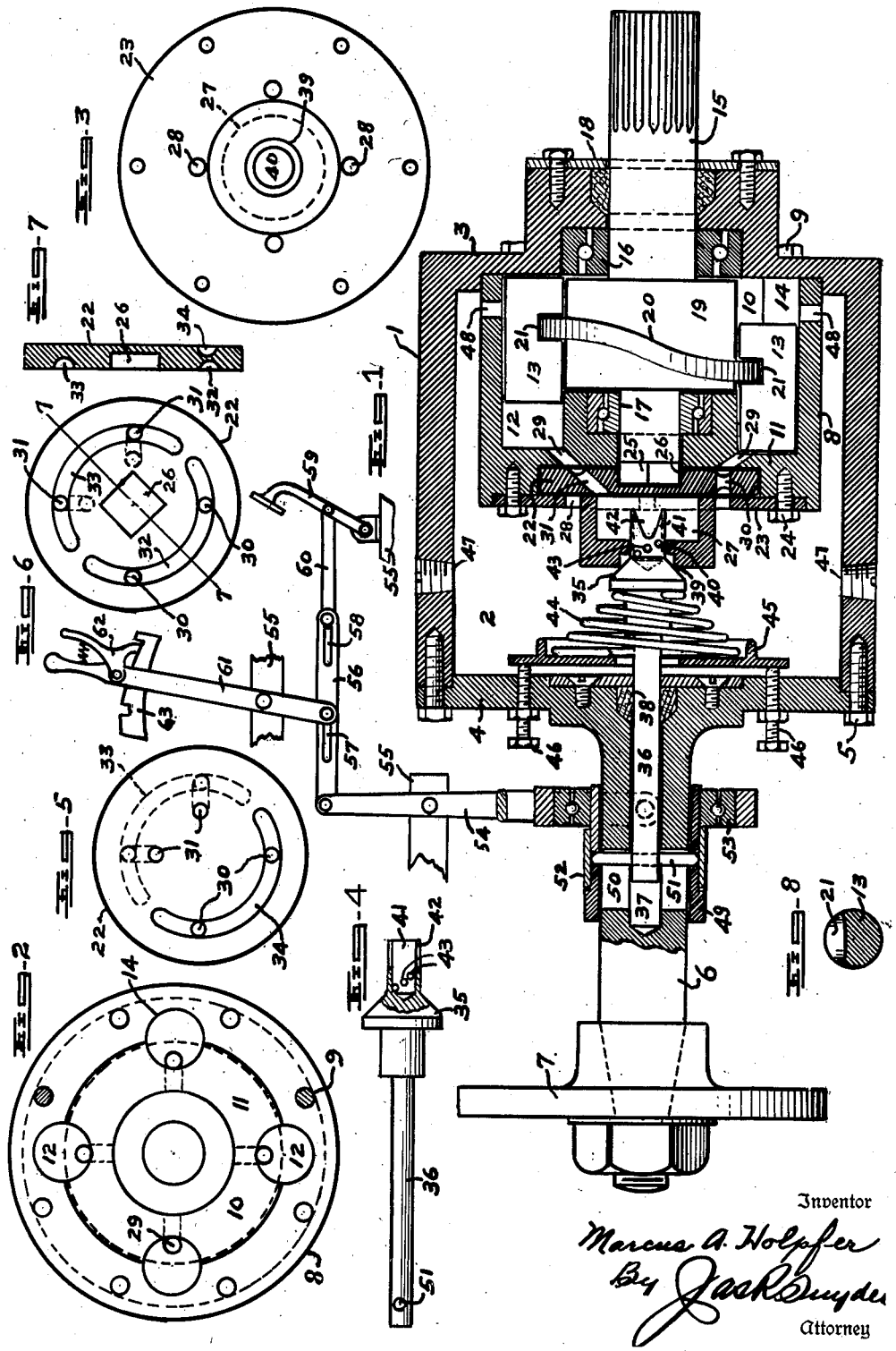
Inventor
Marcus A. Holpfer
By Jack Snyder
Attorney Patented Sept. 16, 1941

2,256,089

UNITED STATES PATENT OFFICE 2,256,089

DRIVE TRANSMISSION

Marcus A. Holpfer, Pittsburgh, Pa.

Application November 13, 1940, Serial No. 365,553

1 Claim. (Cl. 192—59)

This invention relates to a fluid controlled drive mechanism somewhat of the type disclosed in my United States Patent No. 2,215,103, issued September 17, 1940, and while primarily designed and intended for use in connection with the drive mechanism of a motor vehicle, it will be obvious that the device may be employed in any other type of apparatus or for any other purposes wherein it is found to be applicable.

Important objects and advantages of the invention are to provide a drive transmission of the character described, which is hydraulically controlled, which does not require a separate clutch structure to effect its successful operation, which is quietly, positively and automatically operable for transmitting change-speed driving power, which embodies relatively few parts, which is simple in its construction and arrangement, durable, compact, and comparatively economical in its manufacture, installation, operation and maintenance.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that changes in the form, proportions and details of construction may be resorted to that come within the scope of the claims hereunto appended.

In the drawing wherein like numerals of reference designate corresponding parts throughout the several views:

Figure 1 is a longitudinal cross sectional view of a drive transmission constructed in accordance with the invention.

Figure 2 is a forward end view of the plunger casing.

Figure 3 is a rear view of the casing head.

Figure 4 is a side view, partly in cross section, of the adapter valve.

Figures 5 and 6 are, respectively, rear and forward end views of the fluid control valve.

Figure 7 is a sectional view on line 7—7, Figure 6.

Figure 8 is a transverse cross sectional view of one of the plungers embodied in the present invention.

Referring in detail to the drawing 1 denotes a cylindrical housing, providing a fluid chamber 2, and including an integrally formed forward wall 3. The rear end of the housing is closed by an end plate 4, which latter is detachably secured to said housing by bolts 5. A driven shaft 6 is formed integral with and extends rearwardly from the end plate and carries a suitable coupling member 7 adapted for joining said driven shaft with associated transmission elements.

The terms "forward" and "rearward" are herein applied relatively to the position of the drive transmission with respect to forward and rear ends of the motor vehicle in which the transmission may be embodied.

A cylindrical plunger casing 8 is mounted in the fluid chamber 2 and is detachably secured to the forward wall of the housing 1 by means of bolts 9. The casing provides a forwardly disposed cam chamber 10, and includes a thick rear wall 11, which is provided with a plurality of cylinders 12. The latter are disposed longitudinally in parallel relation to each other, and the forward ends thereof open into the cam chamber.

A plunger 13 is shiftably mounted for longitudinal, reciprocal movement in each of the cylinders 12. The length of the plungers is greater than the depth of the cylinders, whereby even when said plungers are in the furthermost rearward discharging positions, the forward end portions thereof will project a considerable distance into the cam chamber 10. The inner surface of the side wall of the cam chamber is formed with arcuate grooves 14, which are longitudinally aligned with and form continuations of the outer portions of the walls of the cylinders. The grooves provide clearances allowing the reciprocal movements of the plungers beyond the open forward ends of respective cylinders.

A driving shaft 15, adapted for connection with an internal combustion engine or other apparatus providing the prime source of power, is axially aligned with the driven shaft 6. The driving shaft extends through the forward wall 3 of the fluid housing 1 and into and through the rear wall 11 of the plunger casing 8. The driving shaft is journalled for rotation in suitable bearings 16 and 17, which latter are mounted in respective walls 3 and 11. A suitable stuffing box 18 is provided for the driving shaft and is mounted in the housing end wall 3 to prevent leakage through the latter around said driving shaft.

The driving shaft 15 carries a cylindrical enlarged portion 19, which may be formed integral with the former or fixed thereto in any other suitable manner. The enlarged shaft portion 19 is disposed within the cam chamber 10, and is preferably commensurate to the length of the latter. An outwardly projecting annular cam 20 is formed integral or otherwise fixed to the periphery of the enlarged shaft portion 19. The cam engages in suitable, transversely extending slots 21, which latter are formed in the inner sides of the projecting forward end portions of respective plungers 13 within the cam chamber. The cam is so shaped and disposed that the rotation thereof will impart longitudinal, reciprocal movements to all of the engaged plungers in respective cylinders 12.

While the number of plungers employed may be varied, the embodiment disclosed provides four plungers, which are disposed at right angles relatively to each other in respective cylinders 12. When the plungers are actuated by the rotation of the cam, one pair of adjacent plungers will shift rearwardly in the fluid discharge stroke, while the other adjacent pair of plungers will simultaneously shift forwardly in the fluid suction stroke. During a full rotation of the cam each of the plungers will have made a full suction and discharge stroke.

A fluid control disk 22 is revolubly mounted in a recess provided therefor at the rear of the casing end wall 11. The disk valve is retained in position by a flanged casing head 23, which is secured to the rear end of the plunger casing 8 by means of bolts 24. The driving shaft 15 has a squared rear end 25, which engages in a correspondingly-shaped pocket 26 formed in the forward face of the disk valve, whereby the rotation of the driving shaft will impart like movement to the engaged disk valve.

The casing head 23 projects rearwardly from the disk valve 22 to provide a valve chamber 27 opening on the latter, and the flanged portion thereof is provided with four fluid inlet ports 28, which are disposed at right angles with respect to each other. The rear end wall 11 of the plunger casing 8 is also provided with four fluid apertures 29. The latter extend at an angle from the horizontal, whereby the forward ends open into the rear end of respective cylinders 12, and the rear ends thereof are in registering alignment with respective inlet ports 28 in the flanged portion of the casing head.

The disk valve 22 is provided with a pair of adjacent, straight suction passages 30, and with a pair of adjacent, discharge passages 31, which latter are disposed at an angle from the horizontal. The relative positions of the ports 28, apertures 29, and passages 30 and 31, is such that, during the rotation of the disk valve the suction passages 30 will be simultaneously brought into registration with respective ports 28 in the casing head 23 and with the rear ends of respective apertures 29 in the casing rear wall 11, while the discharge passages 31 will have their forward ends brought into registration with the forward ends of the other apertures 29, but the rear ends of said discharge passages 31 open into the valve chamber 27. The disk valve is frictionally shiftable between the casing head and plunger casing, and functions to control the passage of the operating fluid to and from the cylinders 12 in the manner to be described.

An arcuately-shaped passage groove 32 is formed on the forward face of the disk valve 22 and provides communication between the forward ends of the pair of suction passages 30. A like shaped groove 33 is also formed on the forward face of the disk valve and provides communication between the forward ends of the pair of discharge passages 31. The ends of the grooves 32 and 33 extend beyond respective ends of the passages 30 and 31, and the ends of the grooves 32 are adjacent to but spaced from the respective ends of the groove 33. A similar arcuately-shaped groove 34 is likewise formed on the rear face of the disk valve, and is directly opposed to the passage groove 32, and provides communication between the rear ends of the passages 30.

The relative position of the cam 20 with respect to the disk valve 22 is such that, when the driving shaft 15 is rotating within the plunger casing 8 during the operation of the device, the two cylinders 12, in which the plungers 13 are shifting forwardly in the suction strokes, will communicate with the fluid chamber 2 through respective apertures 29, grooves 32 and 34, passages 30 and ports 28. The other two cylinders 12, in which the plungers are shifting rearwardly in the discharge strokes, will communicate with the valve chamber 27 through respective apertures 29, groove 33 and passages 31. Due to the provision of the grooves 32, 33, and 34, in the manner stated, the fluid suction and discharge operations are continuous while the driving shaft is rotating in the casing 8, with the two pairs of plungers alternately shifting in the suction and discharge strokes in respective cylinders.

An adapter valve 35 is shiftably mounted in the fluid chamber 2, and is axially aligned with the shafts 6 and 15. The valve 35 includes a guide stem 36 which is longitudinally and shiftably engaged in a bore 37 provided therefor in the driven shaft 6. Suitable packing 38 is mounted in the end plate 4 and surrounds the valve stem to prevent leakage of fluid from the chamber 2 into the bore 37.

The valve 35 is bevelled, and is engaged in a seat 39 provided in the rear wall of the casing head 23. The said rear wall further has a seat aperture 40, which provides communication between the fluid chamber 2 and the valve chamber 27, and through which extends an adapter tube 41. The latter is formed integral with the forward end of the valve 35 and projects into the valve chamber 27 when the said valve is closed by its engagement on the seat 39. The free end of the tube 41 is provided with a pair of opposed, comparatively deep passage notches 42, and with a plurality of small ports 43, which latter are disposed rearwardly of the notches and aligned in a diagonally disposed row.

A spring 44 is mounted in the fluid chamber 2 and engages the valve 35 and a spring plate 45. The latter is also mounted in the fluid chamber and is engaged by locking screws 46, by which the spring plate may be adjusted to adjust the tension of the spring. The normal action of the spring forces the valve 35 toward its seat 39 and tends to hold said valve in the seated closed position, as shown in Figure 1.

The operation of the drive transmission involves the use of liquid in the form of oil or any other suitable fluid. The fluid chamber 2 and the cam chamber 10 are completely filled with the fluid, and the latter may be placed in said chambers or removed therefrom through plugged apertures 47 suitably located in the side wall of the housing 1. A plurality of openings 48 are provided in the rear end portion of the plunger casing 8 to allow the free passage of the fluid to and from the cam chamber 10.

To secure the valve 35 in the open, neutral or inoperative position, a manually operated control mechanism is provided. The latter comprises a sleeve 49 mounted and longitudinally shiftable on the driven shaft 5. The shaft 5 is formed with a transversely disposed slot 50, which is covered by the sleeve 49. A pin 51 extends through the valve stem 36, through the slot 50 and through the sleeve 49, and is maintained in position by an annular spring band 52 clamped around the sleeve 49.

The movement of the pin 51 with the sleeve 49 in the slot 50 limits the movement of the valve 35 to the open position, and such movement of the valve 35 is restricted to prevent the free end of the adapter tube 41 from clearing the rear end of the seat aperture 40. The opening movement of the valve 35 is also limited by the abutment of the said valve against the inner face of the end plate 4.

A suitable bearing 53 is connected on the sleeve 49 and allows the rotation of the latter in the former. A vertically disposed forked lever 54 is pivotally connected with the bearing 53 and with the vehicle structure 55, and has its upper end joined with a horizontally extending pull bar 56. The latter is provided with a pair of elongated slots, respectively indicated at 57 and 58.

A pedal 59 is suitably supported and pivoted to the equipped vehicle structure, and a connecting bar 60 is pivotally connected with said pedal and in the forward slot 58. A hand operated lever 61 is pivotally connected in the rear slot 57 and to the vehicle structure, and is associated with a spring controlled latch 62 and a notched quadrant 63 of the conventional construction.

Unless the hand lever 61 is manually set or secured in the inoperative position by the engagement of the latch 62 in the notched quadrant 63, the construction, arrangement, and operation of the slotted pull bar 56, allow the operation of the pedal independently of the lever 61, or the operation of the latter independently of the pedal. The valve 35 will function automatically without interferring with the hand lever or pedal, and the action of the spring 44 will normally return the pedal and the hand lever to their normal operative positions.

The obvious purpose of the pedal operation is to force the valve 35 to the open position when required, and the purpose of the hand lever operation is provide means for holding said valve in the open position when required or desired.

In practice the operation of my improved drive transmission is as follows: Assuming that the device is embodied in and employed for driving a motor vehicle, the hand lever 61 is set in the released position, as shown in Figure 1. The rotation of the driving shaft 15 will impart reciprocation to the plungers 13, whereby the operating fluid is drawn into the cylinders 12 from the fluid chamber 2, and is discharged from the latter into the valve chamber 27. The fluid will be compressed in the valve chamber and enter the adapter tube 41, whereby the valve 35 is forced rearwardly to the opening position against the action of the spring 44. The fluid from the valve chamber will escape through the ports 43 in the tube 41 and through the aperture 40 back into the fluid chamber 2.

At idling speed, such escape of the fluid will allow the driving shaft 15 to rotate in its bearings 16 and 17 independently of the housing 1. As the speed of the driving shaft is increased, the operation of the plungers will draw the fluid into the cylinders at a greater rate than same can be discharged through the tube ports 43, whereby a resistance is created causing the housing 1 and the driven shaft 6 to rotate with or at varying speed to said driving shaft 15. It will here be noted that, the spring 44 is so adjusted that the driving action is effected while the fluid is being discharged through the tube ports 43 only. The fluid is discharged through the tube notches 42 only when the valve 35 is manually opened by the operation of the pedal 59 or hand lever 61.

The present invention provides a most durable, compact, and efficient device of its kind, which is entirely automatic in its operation, and which may be successfully employed to operate a shaft at any speed to provide the necessary power to effect the starting, propulsion, or operation of the apparatus that it is intended to operate.

What I claim is:

In a fluid controlled drive transmission of the character described, the combination of a housing for the fluid, a driven shaft secured to said housing, a casing including a valve chamber and provided with a plurality of cylinders secured in said casing, a plunger mounted in each of said cylinders, a driving shaft revolubly engaged in said casing, an annular cam carried by said driving shaft and actuated by the rotation of the latter for imparting reciprocal movement to said plungers in said cylinders for drawing the fluid from said housing into said cylinders and for discharging said fluid from said cylinders into said valve chamber, a disk valve operatively engaged by said driving shaft for controlling the passage of the fluid to and from said cylinders, and a spring controlled automatically operable valve element engaged in said driven shaft for regulating the discharge of the fluid from said valve chamber to cause the rotation of said driven shaft at a speed similar to or varying from the speed of said driving shaft.

MARCUS A. HOLPFER.